Figure 3:
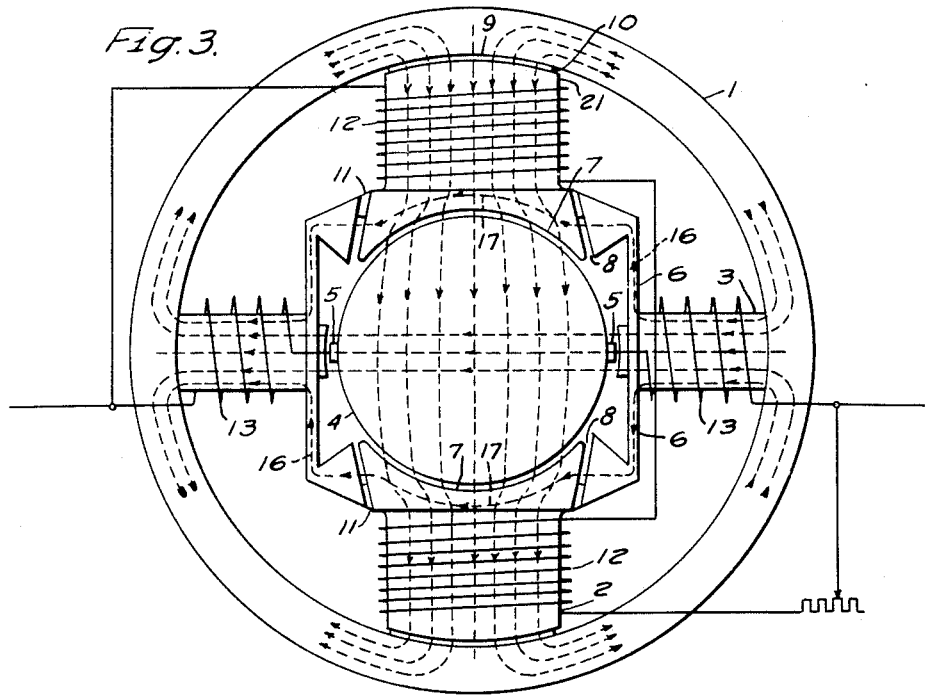

Sept. 20, 1949.    E. C. WATSON ET AL    2,482,526
DYNAMO-ELECTRIC MACHINE
Filed July 9, 1945    2 Sheets-Sheet 1
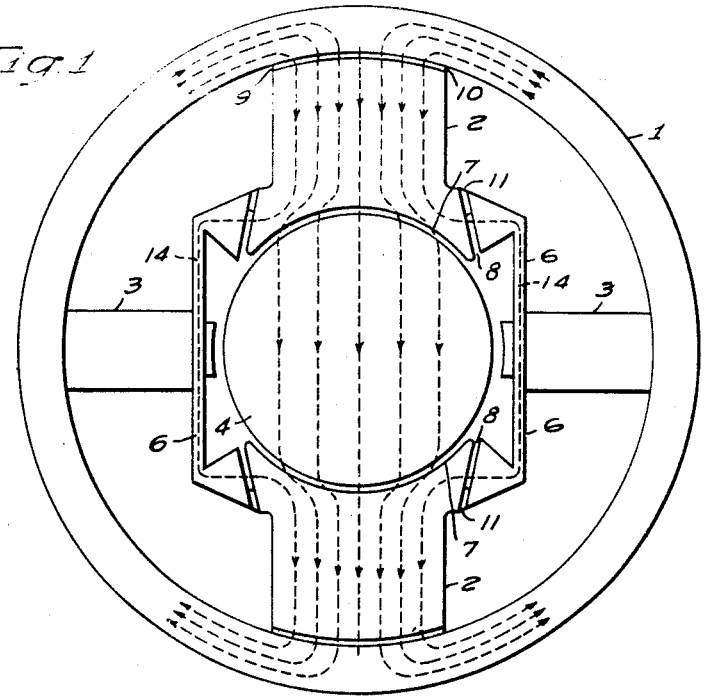
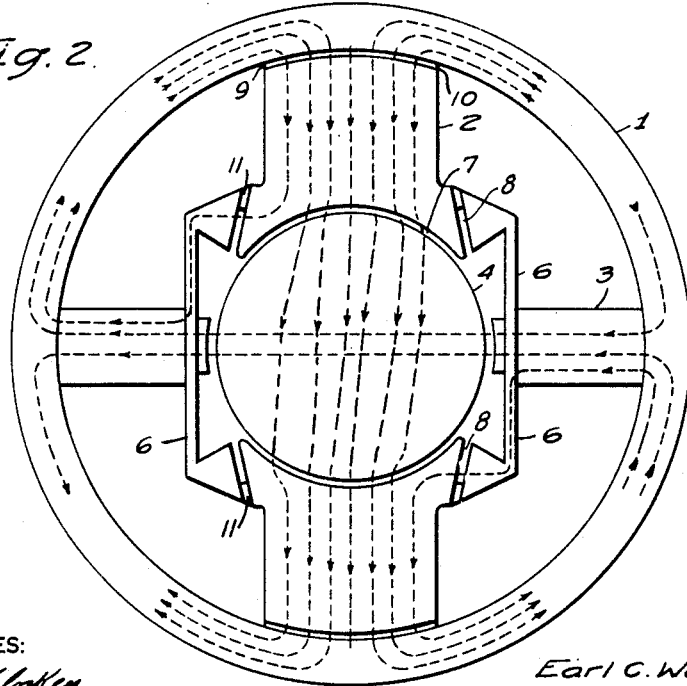
WITNESSES:
INVENTORS
Earl C. Watson and
Albert W. Kimball.
BY
ATTORNEY Sept. 20, 1949.  E. C. WATSON ET AL  2,482,526
DYNAMO-ELECTRIC MACHINE Filed July 9, 1945  2 Sheets-Sheet 2

WITNESSES:
E. A. McCloskey
Wm. C. Groome

INVENTORS
Earl C. Watson and
Albert W. Kimball.
BY
O. B. Buchanan
ATTORNEY

Patented Sept. 20, 1949

2,482,526

UNITED STATES PATENT OFFICE 2,482,526

DYNAMOELECTRIC MACHINE

Earl C. Watson, Turtle Creek, and Albert W. Kimball, Pittsburgh, Pa., assignors to Westinghouse Electric Corporation, East Pittsburgh, Pa., a corporation of Pennsylvania Application July 9, 1945, Serial No. 603,942

11 Claims. (Cl. 322—50)

Our invention relates to self-compounded direct-current dynamo-electric machines having a compounding effect, with either direction of armature-current flow, that is, for both motoring and generating, without requiring a separate series compounding winding for producing the compounding effect just mentioned.

Heretofore, no direct-current dynamo-electric machine has been known, which has a cumulatively compounded effect for both motoring operation and generating operation. When compounded generators have been paralleled, difficulty has been experienced, particularly at light loads, when one generator might tend to operate as a motor, thereby having either no compounding effect, or more usually a differential compounding effect, depending upon the type of generator, thus greatly aggravating the difficulty by causing the flow of much more reversed current through the motoring machine. When compounded motors have been reconnected for operation in the reversed direction, it has been necessary to reverse the direction of current-flow through the armature, with respect to the direction of current-flow through the series compounding fields. When compounded direct-current machines have had field-adjustment, by means of a shunt field rheostat, either for variable-voltage generator-operation, or for variable-speed motor-operation, difficulty has been experienced because the compounding effect becomes disproportionately large with weakened field-excitation, thus considerably changing the relative amount of compounding, at different adjustments of the field-excitation. When a variable-voltage compound generator has been directly connected to a voltage-controlled compound motor, for controlling the speed of the motor, if the motor should operate regeneratively, both of the compounding effects heretofore have become differential effects, resulting in very excessive regenerative currents.

It is an object of our invention to avoid the difficulties of all of the foregoing, and other, applications of compound direct-current machines, by providing a construction in which the compounding effect remains cumulative, and in general proportionate to the amount of shunt-field excitation, regardless of the direction of the armature-current.

A more specific object of our invention is to provide a direct-current machine having interpoles between the main poles, and having a magnetic shunt between each side of each interpole and the next adjacent main pole. A still further object of our invention is to provide a construction in which the amount of the compounding-effect can readily be adjusted and controlled by means of variable air-gaps, such as are obtainable by the use of magnetic and non-magnetic shims.

Figure 4:
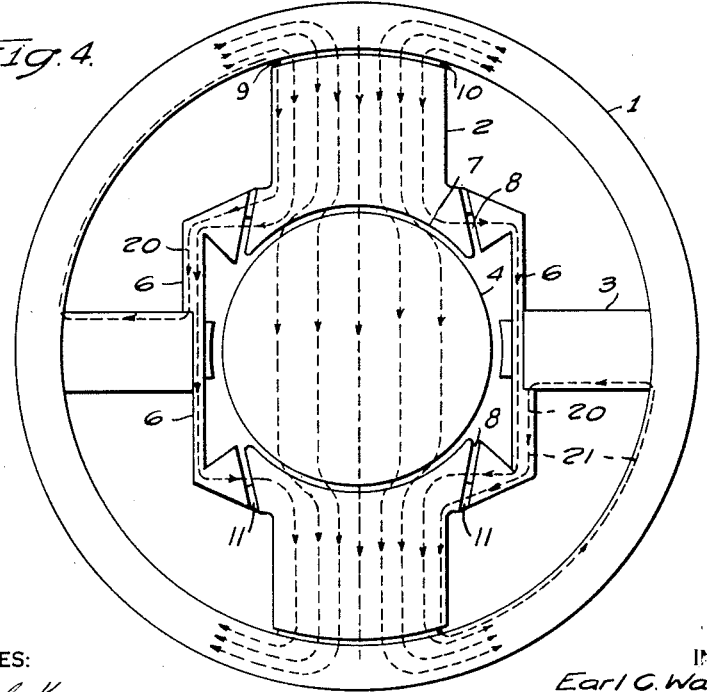

With the foregoing and other objects in view, our invention consists in the combinations, systems, apparatus, structures and methods hereinafter described and claimed, and illustrated in the accompanying drawings, wherein Figs. 1, 2 and 3 are diagrammatic views of a preferred form of embodiment of our invention, illustrating qualitatively the changes in flux-distribution at no-load, light-load, and heavy load, respectively, the main and interpole windings being omitted, for the sake of clarity, except in the case of Fig. 3, where such windings are diagrammatically represented, and Fig. 4 is a view similar to Fig. 1, illustrating a modification of our invention, in which the compounding effect of a generator is greater on motoring, than during its normal generating-operation, thus tending to very much reduce the magnitude of the motoring currents.

We have illustrated our invention, in each case, as a two-pole machine, but we desire it to be understood that the machine, in any case, can have any number of pairs of poles. We wish the following description to be read, therefore, with this general comment in mind.

In the drawings, therefore, we have illustrated a two-pole direct-current dynamo-electric machine, which may be either a motor or a generator, having a frame or yoke member 1, two main poles 2, and two interpoles 3, by interpoles meaning any auxiliary poles interposed between the main poles, whether such interpoles are utilized as commutating poles or as neutralizing poles for neutralizing the magnetic effect of the armature ampere-turns. In common with other direct-current machines, our machine has a rotatable armature 4, of the commutator type, having brushes 5 bearing thereon, as indicated in Fig. 3.

In accordance with our invention, we provide a magnetic shunt 6 between each side of each interpole 3, and the pole-face 7 of the adjacent main pole 2. Preferably an air-gap 8 is provided between each end of each magnetic shunt 6 and the associated end of the pole face 7 of the adjacent main pole 2, so that the shunt-path air-gap 8 and the shunt-path magnetizable material 6, will together comprise a complete magnetic shunt, in the sense of a deliberately provided shunt-path (as distinguished from a casual leakage-path) for magnetic flux between the pole-face portion of an interpole and the pole-face portion of the adjacent main pole, on either side of the interpole. The term "magnetic shunt" is used in both senses, both as referring to the magnetizable material which causes the existence of a shunt-path for magnetic flux, and the complete magnetic flux-path which shunts some of the magnetic flux away from the armature 4, the particular sense in which the term is used being apparent, in each case, from the context.

Preferably also, an air-gap 9 is provided in each of the main poles 2, somewhere between the pole-face portion 7 and the frame 1, preferably between the back of each main pole-piece 2 and the frame. The air-gap 9 may be provided by inserting a shim 10 of non-magnetic material between the back of the pole-piece 2 and the frame, the length of the air-gap 9 being varied either by the thickness of the shim, or by substituting a plurality of shims of magnetic and non-magnetic materials, in different proportions. The effective length or breadth of the air-gap 8 may be similarly adjusted by shims or inserts of magnetic or non-magnetic material, as indicated at 11, particularly if a non-linear characteristic is desired.

As shown in Fig. 3, it is to be understood, of course, that the main poles 2 are provided with shunt-type exciting-windings 12, while the interpoles 3 are provided with series interpole-windings 13. However, for clearness of illustration, these windings are omitted in all figures except Fig. 3.

The operation of our invention is best understood by reference to Figs. 1, 2 and 3, showing different degrees of loading of the machine, considering the machine, for the purpose of explanation and discussion, as if it were a generator, although it is to be understood that the invention is useful either as a generator or as a motor.

At no-load, as shown in Fig. 1, that is, with no current in the armature 4, and hence no excitation on the interpoles 3, a portion of the main-pole flux is shunted around the armature, by the shunts 6, as indicated by the dotted lines 14. The amount of shunted flux is controlled by the reluctance of the shunt 6, and this is in turn readily controlled, after the machine has once been designed, by controlling the effective length or cross-section of the shunt air-gaps 8. The design is preferably such that the shunting flux which passes through the magnetic shunt 6, at no-load, is sufficient, or very nearly sufficient, to practically saturate the shunt 6, or at least to begin to cause saturated conditions.

When load is applied to the machine, a magnetomotive force is produced in each of the interpoles 3, and this magnetomotive force tends to produce a flux which opposes the shunt flux 14 in one-half of the shunt 6, and tends to augment it in the other half. We have illustrated the main flux as passing downward on the sheet, and the interpole flux as passing to the left, when the machine is operating as a generator. This tends to reduce (or even reverse) the flux in the top half of the right-hand magnetic shunt 6, and in the bottom half of the left-hand magnetic shunt 6, while tending to increase the flux in the other halves of the magnetic shunts. However, since the magnetic shunt was already operating substantially under saturated conditions, no substantial increase in flux, or only a relatively small increase, is produced in the halves of the magnetic shunts in which the interpole magnetomotive force tends to increase the flux.

Fig. 2 has been drawn for a light-load condition in which the shunt flux is reduced substantially to zero, in the halves of the magnetic shunts 6 in which the interpole magnetomotive force bucks the shunt flux. The effect of this reduction in the shunt flux in these bucked halves of the magnetic shunt 6, without a corresponding increase in the shunt flux in the other or cumulative-flux halves of the magnetic shunts, is to reduce the amount of main-pole flux which is diverted from the armature 4, thus increasing the amount of flux which interlinks with the armature 4, thus producing a compounding effect.

In order that a reduction in the shunt flux which is diverted from the armature 4 by the magnetic shunts 6 may result in an increase in the magnetic flux which traverses the armature 4, it is necessary for a certain magnetic potential-drop to exist in the main-poles 2, as otherwise the amount of flux traversing the armature 4 would not be affected by the amount of shunt flux through the magnetic shunts 6. To this end, it is necessary to have either a saturation-effect in the main-poles 2, or an air-gap 9 between the backs of the main-poles and the frame, or both effects may be utilized. The use of the air-gaps 9 is advantageous in providing a ready means whereby the magnitude of the magnetomotive force-drop in the main-poles may be controlled and adjusted.

At heavier loads, as shown in Fig. 3, the flux in the bucked portion of the magnetic shunt 6 may even be reversed, and this effect continues on increasing loads until the reversed flux in these halves of the magnetic shunt 6 may be sufficient to saturate said halves of the shunts in the reverse direction, after which, further increases in the load do not have very much effect, if any.

As shown in Fig. 3, the effect of a reversal of the shunt flux, in one-half of the magnetic shunt 6, as shown at 16, is to produce a cross-flux 17, flowing across the pole-faces 7 of the main-poles 2, thus diverting none of the main-pole flux from the armature 4, and producing a maximum flux-interlinkage of the main flux with the armature. This produces a machine having a compounding effect up to a certain predetermined load-current, corresponding to the point when the reversed shunt flux 16 reaches its saturation-magnitude in the magnetic shunts 6. For still larger armature-currents or loads, the machine thereafter operates more nearly like an ordinary shunt machine, without any substantial compounding effect.

The advantages of our invention, and its various practical applications, have already been explained, in the statement of the nature and objects of the invention.

An important feature of the invention is, that even though the armature-current should reverse, which is to say, that even though the cross-flux, in the interpoles 3, should reverse, and flow to the right instead of to the left, there would still be a compounding effect, because the shunt flux in one-half of each magnetic shunt 6 will remain substantially constant, at its same saturation-value which it had at no-load, while the shunt flux in the other half of each magnetic shunt 6 will first be reduced, and then reversed, and increased in the reversed direction up to the saturation-point again. Thus, our machine does not change from a cumulatively compounded machine to a differentially compounded machine, when the armature current reverses.

Although, in many applications of our invention, it is advantageous for the machine to have the same degree of compounding effect for either direction of the armature-current, we are not limited to this detail. It will be noted that the amount of the compounding effect is dependent upon the dimensions of that half of the magnetic shunt 6 in which the flux reverses, as shown at 16 in Fig. 3. So long as the flux in the other half of the magnetic shunt 6 remains at its saturation-value, the dimensions of this half of the magnetic shunt have no substantial effect upon the amount of compounding.

However, when the armature-current reverses, the two halves of the magnetic shunt are reversed, and hence it is possible, as shown in Fig. 4, to increase the flux-carrying ability, or cross-section, of the cumulative-flux half 20 of each of the magnetic shunts 6, without changing the amount of compounding-effect, which is determined by the flux-carrying ability of the other half of the magnetic shunts, when the machine is operating as a generator, so long as the design is such that the large-sectional half 20 of the magnetic shunt 6 is saturated. However, when the machine operates as a motor, it is the shunt flux in the large half 20 which is bucked, and finally reversed, on increasing loads, and hence it is possible to produce a larger compounding effect, on reversed armature-currents, than is obtained with armature-currents flowing in the normal direction of current-flow. The effect of the dissimilarities in the flux-carrying abilities of the two halves of the magnetic shunts 6, as shown in Fig. 4, is to produce a shunt flux 21 which circulates at all times, without ever passing through the armature 4. At no-load, this shunt flux is produced by the main-field excitation. At heavy loads, it is produced by the interpole excitation. It constitutes a wasted flux which has no purpose other than to make it possible for the machine to have different amounts of compounding effects on motoring and generating.

We claim as our invention:

1. A direct-current dynamo-electric machine having a frame, a plurality of main poles, an interpole between each pair of main poles, a rotatable commutator-type armature, brushes bearing thereon, shunt-type exciting-windings for exciting said main poles, series interpole-windings for exciting said interpoles, a magnetic shunt between each side of each interpole and the pole-face portion of the adjacent main pole, and means for causing said main poles to have sufficient reluctance so that a material magnetic potential-drop is caused by the traversal of the main poles by the magnetic flux thereof.

2. A machine as defined in claim 1, characterized by both halves of each magnetic shunt, on each of the two sides of the associated interpole, having approximately the same flux-carrying capacity, so as to become saturated at approximately the same flux.

3. A generator as defined in claim 1, characterized by the half of each magnetic shunt in which the interpole magnetomotive force tends to increase the flux during generating operation having a larger flux-carrying capacity than the other half of each magnetic shunt.

4. A machine as defined in claim 1, characterized by each magnetic shunt having such a flux-carrying capacity as to at least approach a saturated condition at no-load.

5. A generator as defined in claim 1, characterized by the half of each magnetic shunt in which the interpole magnetomotive force tends to increase the flux during generating operation having a larger flux-carrying capacity than the other half of each magnetic shunt, and further characterized by the large-capacity half of each magnetic shunt having such a flux-carrying capacity as to at least approach a saturated condition at no-load.

6. A machine as defined in claim 1, characterized by each half of each magnetic shunt having an airgap therein.

7. A machine as defined in claim 1, characterized by each half of each magnetic shunt having an airgap therein, and each main pole having an airgap therein between its pole-face portion and the frame.

8. A machine as defined in claim 1, characterized by each main pole having an airgap therein between its pole-face portion and the frame.

9. A direct-current dynamo-electric machine having a frame, a plurality of main poles, an interpole, a rotatable commutator-type armature, brushes bearing thereon, shunt-type exciting-windings for exciting said main poles, series interpole-windings for exciting said interpole, a magnetic shunt between said interpole and the pole-face portion of an adjacent main pole, and means for causing said adjacent main pole to have an airgap between its pole-face portion and the frame.

10. A direct-current dynamo-electric machine having a frame, a plurality of main poles, an interpole, a rotatable commutator-type armature, brushes bearing thereon, shunt-type exciting-windings for exciting said main poles, series interpole-windings for exciting said interpole, and a magnetic shunt between said interpole and the pole-face portion of an adjacent main pole, said magnetic shunt having an airgap therein, and means for causing said adjacent main pole to have sufficient reluctance so that a material magnetic potential-drop is caused by the traversal of said adjacent main pole by the magnetic flux thereof.

11. A machine as defined in claim 9, characterized by said magnetic shunt having an airgap therein.

EARL C. WATSON.
ALBERT W. KIMBALL.

REFERENCES CITED

The following references are of record in the file of this patent:

UNITED STATES PATENTS

| Number | Name | Date |
|---|---|---|
| 1,680,731 | Deale | Aug. 14, 1928 |
| 1,774,304 | Turbayne | Aug. 26, 1930 |

FOREIGN PATENTS

| Number | Country | Date |
|---|---|---|
| 233,235 | Germany | Apr. 3, 1911 |